United States Patent Office 3,036,121
Patented May 22, 1962

3,036,121
BRIGHTENING AGENTS FROM STILBENE DI-
CARBOXYLIC ACID AMIDES
Robert S. Long, Bound Brook, and Sien M. Tsang, Middlesex, N.J., assignors to American Cyanamid Company, New York, N.Y., a corporation of Maine
No Drawing. Filed Dec. 16, 1957, Ser. No. 702,805
2 Claims. (Cl. 260—507)

This invention relates to new fluorescent compounds and, more specifically, it relates to new compounds of the structure:

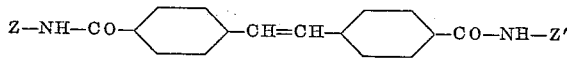

in which Z and Z' are carbocyclic aryl radicals of less than three six membered rings, the said aryl radicals being sulfonated. These compounds are fluorescent brightening agents.

We have found that compounds of the structure:

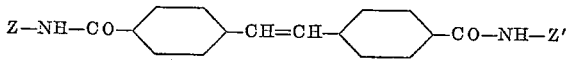

in which Z and Z' are carbocyclic aryl radicals of not more than two rings substituted by sulfonic acid radicals, show fluorescence under ultraviolet light and can be used as optical bleaching agents. In the preparation of these optical bleaching agents the stilbene dicarboxylic acid is used to acylate amino aryl sulfonic acids. The latter may be further substituted by alkyl, alkoxy, triazinylamino, and similar groups. Among the amino aryl sulfonic acids which may be used are sulfanilic acid, metanilic acid, 3-amino-4-methoxy benzene sulfonic acid, 4-amino-3-methoxy benzene sulfonic acid, 3-amino-4-(2,4-dianilino-1,3,5-triazinyl-6-amino) benzene sulfonic acid, naphthionic acid, 5-amino-naphthalene-1-sulfonic acid, 5-amino-naphthalene-2-sulfonic acid, 3-aminonaphthalene-1,5-disulfonic acid, and the like.

The stilbene dicarboxylic acid amides can be prepared by a variety of conventional methods. Thus, the stilbene dicarboxylic acid may be converted to the di-acid chloride by the use of phosphorus trichloride, phosphorus pentachloride, phosphorus oxychloride, thionyl chloride, or a similar agent. The acid chloride may then be reacted with two moles of the amine or aminoazo compound, in the presence of an inert solvent if necessary. A convenient method is to heat the dicarboxylic acid in an excess of thionyl chloride under reflux, to distill off the excess reagent, and to treat the acid chloride with the amine in pyridine at the boil. Still better, the dicarboxylic acid is reacted with only the theoretical amount of thionyl chloride by gentle warming in pyridine, and the amine is then added directly to the reaction mixture, which is then heated at the boiling point. An alternative method whereby one may isolate the acid chloride in pure form is to heat the dicarboxylic acid with the theoretical amount of thionyl chloride in an indiffferent medium such as nitrobenzene; the acid chloride precipitates out and may be filtered off; it is then reacted with the amine as before.

It is an advantage of these new optical bleaching agents that a variety of fluorescent compounds are easily obtained from readily available intermediates. Many of the above aminoaryl sulfonic acids are used in preparing other dyes and are thus available intermediates. With the stilbene dicarboxylic acid on hand, a wide variety of fluorescent optical bleaching agents can be obtained by the use of different aminoaryl sulfonic acids.

By using equimolar quantities of one aminoaryl sulfonic acid, followed by a similar quantity of another, it is easily possible to prepare optical bleaching agents which are unsymmetrical, i.e., in which Z and Z' are different.

This is a further advantage of our invention, in that it provides an unusually flexible type of optical bleaching agent structure, in which variations in the properties are easily made by changing the identity and quantity of the aminoaryl sulfonic acid groups.

This application is a continuation in part of our copending application, Serial No. 401,376, filed December 30, 1953, now Patent No. 2,877,218.

Our invention can be illustrated by the following examples, in which parts are by weight unless otherwise specified.

Example 1

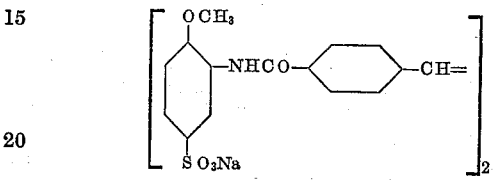

A mixture of 2.68 parts of stilbene-4,4'-dicarboxylic acid, 2.46 parts of thionyl chloride and 19.6 parts of dried pyridine is heated at 60° C. until conversion to the acid chloride is substantially complete. The mixture is then refluxed with 5.08 parts of 3-amino-4-methoxybenzene-sulfonic acid until the condensation is substantially complete. The resulting mixture is drowned into about 250 parts of water containing 40 parts of sodium chloride and 4.5 parts of sodium carbonate. After the removal of the pyridine by steam distillation, the diamide is isolated by filtration. The product shows a blue fluorescence on cellulosic fibers under UV light.

If an equivalent amount of sulfonilic acid is used in place of the aminomethoxybenzene sulfonic acid, the corresponding bis 4-sulfoanilide is obtained.

Example 2

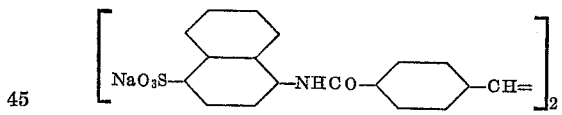

The procedure of the preceding example is followed, using 5.58 parts of naphthionic acid in place of the 3-amino-4-methoxybenzene sulfonic acid. A good yield of the fluorescent product is obtained.

Similarly, equivalent amounts of 5-amino naphthalene-1-sulfonic acid and 3-aminonaphthalene 1,5-disulfonic acid can be substituted for the aminomethoxybenzene sulfonic acid to give the corresponding amides.

Example 3

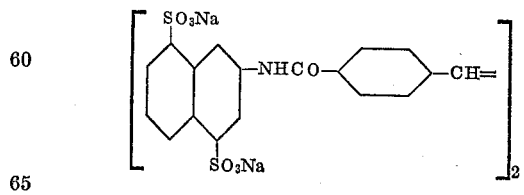

The diamide is prepared by the procedure of Example 1 except that 2.68 parts of stilbene-4,4'-dicarboxylic acid, 2.62 parts of thionyl chloride, 39.3 parts of pyridine and 7.58 parts of 2-aminonaphthalene-4,8-disulfonic acid are used. The product shows a greenish-blue fluorescence on cellulosic fibers under UV light.

Example 4

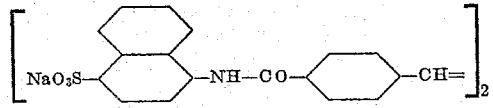

The procedure of Example 1 is followed except that only 2 parts of the aminomethoxybenzene sulfonic acid is used and, when the reaction with it is substantially complete, there is then added 2.8 parts of 3-amino-4-(2,4-dianilino-1,3,5-triazinyl-6-amino) benzene sulfonic acid, and the refluxing is continued until the reaction is substantially complete.

We claim:

1. A compound having the formula:

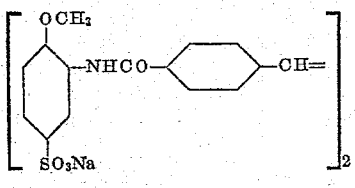

2. A compound having the formula:

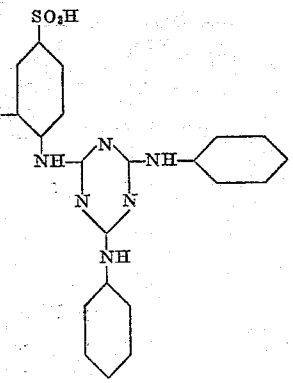

References Cited in the file of this patent
UNITED STATES PATENTS

| | | |
|---|---|---|
| 2,521,665 | Hausermann | Sept. 5, 1950 |
| 2,567,796 | Ackermann | Sept. 11, 1951 |
| 2,688,617 | Hein et al. | Sept. 7, 1954 |
| 2,898,371 | Long et al. | Aug. 4, 1959 |